(12) United States Patent
Losacco et al.

(10) Patent No.: US 11,463,250 B2
(45) Date of Patent: Oct. 4, 2022

(54) SHARING DATA AMONG DIFFERENT SERVICE PROVIDERS AT EDGE LEVEL THROUGH COLLABORATION CHANNELS

(71) Applicant: KYNDRYL, INC., New York, NY (US)

(72) Inventors: Vito Losacco, Rome (IT); Andrea Gianfelici, Rome (IT); Pierfrancesco Poce, Rome (IT)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/120,571

(22) Filed: Dec. 14, 2020

(65) Prior Publication Data

US 2022/0191009 A1 Jun. 16, 2022

(51) Int. Cl.
*H04L 9/08* (2006.01)
*H04L 67/12* (2022.01)
*G06F 21/60* (2013.01)

(52) U.S. Cl.
CPC .................................... *H04L 9/088* (2013.01)

(58) Field of Classification Search
CPC ........ H04L 9/088; H04L 67/12; G06F 21/606
See application file for complete search history.

(56) References Cited

U.S. PATENT DOCUMENTS

| | | | |
|---|---|---|---|
| 9,762,663 B2 | 9/2017 | Losacco | |
| 9,848,035 B2 | 12/2017 | Pogorelik | |
| 10,397,594 B2 | 8/2019 | Jain | |
| 10,880,743 B1* | 12/2020 | Berzin | H04L 41/0806 |
| 2013/0151624 A1* | 6/2013 | Bhogal | G06F 3/0484 709/205 |
| 2016/0330209 A1* | 11/2016 | Iacob | H04L 9/0825 |
| 2019/0044949 A1 | 2/2019 | Bartfai-Walcott | |
| 2021/0144517 A1* | 5/2021 | Guim Bernat | G06F 9/4881 |
| 2021/0352472 A1* | 11/2021 | Ganesan | H04W 8/18 |
| 2022/0014589 A1* | 1/2022 | Padiyar | G06N 10/00 |

(Continued)

FOREIGN PATENT DOCUMENTS

| | | |
|---|---|---|
| CN | 110099367 A | 8/2019 |
| JP | 2016521854 A | 7/2016 |

OTHER PUBLICATIONS

Barahouei et al., "Convince: Collaborative Cross-Camera Video Analytics at the Edge", arXiv:2002.037997v1 [cs.CV] Feb. 5, 2020, 6 pages.

(Continued)

*Primary Examiner* — Vu V Tran
(74) *Attorney, Agent, or Firm* — Erik Swanson; Andrew M. Calderon; Roberts Calderon Safran & Cole, P.C.

(57) ABSTRACT

A solution is proposed for sharing data among different service providers. A corresponding method comprises establishing (under the control of a collaboration computing system) one or more collaboration channels; each collaboration channel is among one or more producer edge computing systems (providing the data of one or more shared categories) and one or more consumer edge computing systems (authorized to receive the data of one or more shared categories). Each collaboration channel is then used by each producer edge computing system to provide the data of the corresponding shared categories to the consumer edge computing systems that are authorized to receive them.

20 Claims, 7 Drawing Sheets

(56) References Cited

U.S. PATENT DOCUMENTS

2022/0166848 A1* 5/2022 Banerjee ................. H04L 67/52
2022/0215002 A1* 7/2022 Luo .......................... G06T 1/60

OTHER PUBLICATIONS

Disclosed Anonymously et al., "Establishing Trusted Source of IoT data among collaborating participants", An IP.com Prior Art Database Technical Disclosure, IP.com No. IPCOM000259307D, IP.com Electronic Publication Date: Jul. 28, 2019, 7 pages.

Gazzaz et al., "Collaborative Edge-Cloud and Edge-Edge Video Analytics", SoCC '19, Nov. 20-23, 2019, Santa Cruz, CA, USA, © 2019 Association for Computing Machinery, 1 page.

Karagiannis et al., "Edge Computing with Peer to Peer Interactions: Use Cases and Impact", Accepted at: Workshop on Fog Computing and the IoT (IoT-Fog), pp. 1-5, 2019, ACM, 6 pages, DOI: 10.1145/3313150.3313226, 6 pages.

Li et al., "EdgeCare: Leveraging Edge Computing for Collaborative Data Management in Mobile Healthcare Systems", Special Section On Collaboration for Internet of Things, IEEE Access, Date of current version Mar. 1, 2019, 15 pages.

* cited by examiner

SHARING DATA AMONG DIFFERENT SERVICE PROVIDERS AT EDGE LEVEL THROUGH COLLABORATION CHANNELS

BACKGROUND

The present disclosure relates to the information technology field. More specifically, this disclosure relates to the sharing of data among service providers.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Collection of different types of data is commonplace in several (software) applications. Particularly, in computing systems with distributed architecture based on (telecommunication) networks, the data may be collected locally and then transmitted remotely for their processing. A typical example is in the Internet, wherein service providers collect the data for providing corresponding services; particularly, in case of cloud (computing) environments, the (cloud) services are provided by cloud (service) providers, which provision, configure and release computing resources required for their implementation upon request (with an actual implementation thereof that is completely opaque to corresponding users).

However, this (centralized) approach requires the transmission of all the data that are collected (locally) over the networks for their processing (remotely). For example, in the Internet the data may be collected by several collection (computing) devices for their transmission to the service providers. Particularly, with the advent of the Internet of Things (IoT), a plethora of IoT (computing) devices (adding Internet connectivity to objects different from computers) have been deployed for their use substantially everywhere. This has involved a high number of new applications, more and more pervasive in the common life of everybody.

In an edge architecture, the processing of the collected data is moved physically as close as possible to where it is needed at the edge of the networks. The edge architecture then concentrates the processing as much as possible locally, before delegating it to the (remote) service providers. In this way, it is possible to reduce a corresponding latency (caused by the transmission of the data remotely for their processing), which is especially important in case of critical applications; moreover, this promotes security and privacy of the data.

For example, each service provider may have a data center (or more) that implements its services centrally. Moreover, the service provider exploits a number of collection devices that collect the data to be processed locally; for example, the collection devices are sensors of the service provider that are deployed on the field, or personal devices of users that are registered with the service provider. Moreover, the service provider has edge servers that are arranged at the edge of the network, so as to be close to a group of corresponding collection devices. Each edge server than collects the data from the corresponding collection devices and per-process them locally; the edge server then uploads these (pre-processed) data to the data center, which completes their processing when it is necessary.

SUMMARY

In one aspect of the present invention, a method, a computer program product, and a system for sharing data among a plurality of service providers includes: (i) receiving a set of availability notifications from a set of central computing systems, the availability notifications indicating an availability of a producer computing system to share data of a shared category and of data categories of data available to the producer computing system; (ii) receiving authorization notifications from the set of the central computing systems, the authorization notifications indicating an authorization of a consumer computing system to receive the data of the shared category provided by a set of producer computing systems of a corresponding service provider; and (iii) establishing a set of collaboration channels among the set of producer computing systems and a consumer computing system authorized to receive the data of the shared category for use by producer computing system to provide the data of the shared category to the consumer computing system of the collaboration channel.

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its properties, like value, content and representation).

Particularly.

DETAILED DESCRIPTION

Figure 1A:
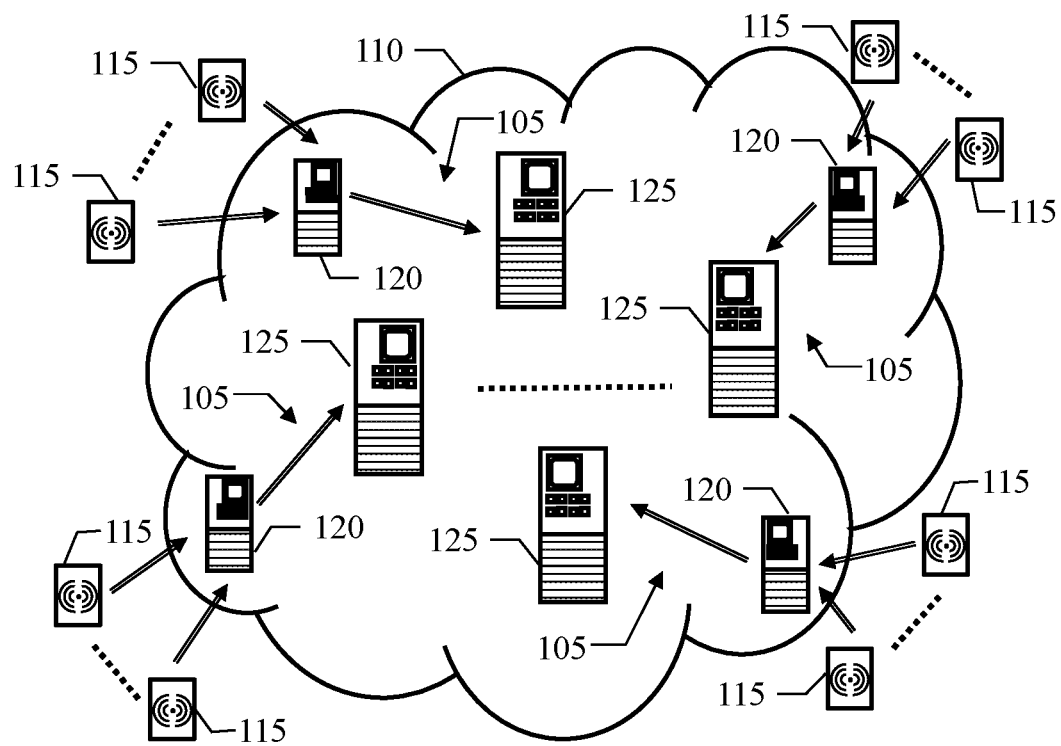
FIG. 1A-FIG. 1D show the general principles of the solution according to an embodiment of the present disclosure.

Data transmission practices as currently handled involves the collection of an immense amount of data (big data). However, whereas a computing capability of the service providers continues to increase (so as to be generally enough for this purpose), the bandwidth of the networks is not always adequate. As a consequence, the networks may become congested and then create corresponding bottlenecks, which do not allow guarantee acceptable transfer rates. This may be deleterious for the performance of critical applications that are time-sensitive.

For an edge computing architecture, the need of leveraging physical proximity forces each service provider to deploy its collection devices with a widespread distribution. This proliferation of the collection devices involves an increase of costs for the service provider (for example, for installing and maintaining them), and then of the corresponding services that are offered by the service provider. Moreover, the corresponding dissemination of the collection devices by the different service providers may adversely affect a corresponding environment where they are installed (for example, when the collection devices have a significant visual impact).

In any case, the unavoidable limitation of the collection devices of each service provider (because of either economical or physical constraints) limits the amount of data that may be collected, either in general or at least in specific locations; this reflects on a corresponding limitation of a quality of the results obtained by the processing of the data, and then of the corresponding services that are offered by the service provider.

Moreover, the use of different services offered by corresponding service providers (based on different data collected by their collection devices) may be problematic. For example, the aggregation of the information received from the different service providers is time consuming; moreover, this operation may be difficult and/or unreliable, especially when it is not possible to ensure the trustworthiness of the corresponding data that have been collected.

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of sharing data among different service providers at edge level through collaboration channels.

Particularly, an embodiment provides a method for sharing data among different service providers. The method comprises establishing (under the control of a collaboration computing system) one or more collaboration channels; each collaboration channel is among one or more producer edge computing systems (providing the data of one or more shared categories) and one or more consumer edge computing systems (authorized to receive the data of one or more shared categories). Each collaboration channel is then used by each producer edge computing system to provide the data of the corresponding shared categories to the consumer edge computing systems that are authorized to receive them.

A further aspect provides a computer program for implementing the method.

A further aspect provides a corresponding computer program product.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

With reference in particular to FIG. 1A-FIG. 1D, the general principles are shown of the solution according to an embodiment of the present disclosure.

Starting from FIG. 1A, a plurality of service providers 105 based on the edge architecture provide corresponding services (computing functionalities that may be used repeatedly over time for different purposes by different users) over a (telecommunication) network 110. For example, the service providers 105 are cloud (service) providers, each providing a pool of (cloud) services implemented by virtual computing resources (provisioned, configured and released very rapidly), which are allocated upon request to its users, such as over the Internet in case of a public deployment model.

Each service provider 105 has a plurality of collection (computing) devices 115 (for example, dedicated sensors thereof or personal devices of its users); the collection devices 115 are used to collect data (or dimensions) of one or more (data) categories (such as photographs, health parameters, environment indicators and so on). The service provider 105 has one or more edge computing systems, for example, edge servers 120. Each edge server 120 is arranged at an edge of the network 110, so as to be in close (physical) proximity to a corresponding group of collection devices 115 (for example, within 1-2 hops from them, such as in the last mile of the network 110); the edge server 120 is then used to pre-process the data collected by the corresponding group of collection devices 115 locally. The service provider 105 has a central computing system, for example, a central data-center 125 (or more). The central data-center 125 (arranged more deeply in the network 110) is used, when necessary, to complete the processing of the (possibly pre-processed) data that are uploaded thereto by the edge servers 120.

Figure 1B:
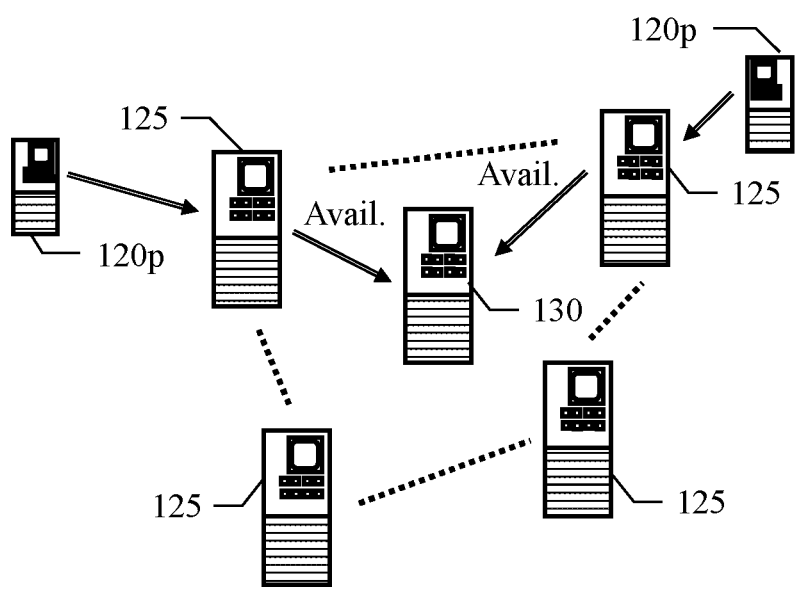

Moving to FIG. 1B, in the solution according to an embodiment of the present disclosure, a collaboration computing system, for example, a collaboration server 130 (of a collaboration authority) controls a sharing of the data collected by the different service providers locally. Briefly, any service provider available to share its data (locally) notifies the collaboration authority accordingly. Particularly, a (central) server of the corresponding central data-center 125 (denoted with the same reference) sends an (availability) notification to the collaboration server 130, indicating that one or more (producer) edge servers of the service provider, differentiated with the reference 120p, are available to share the data of one or more (shared) categories, among the ones of the data that are available thereto.

Figure 1C:
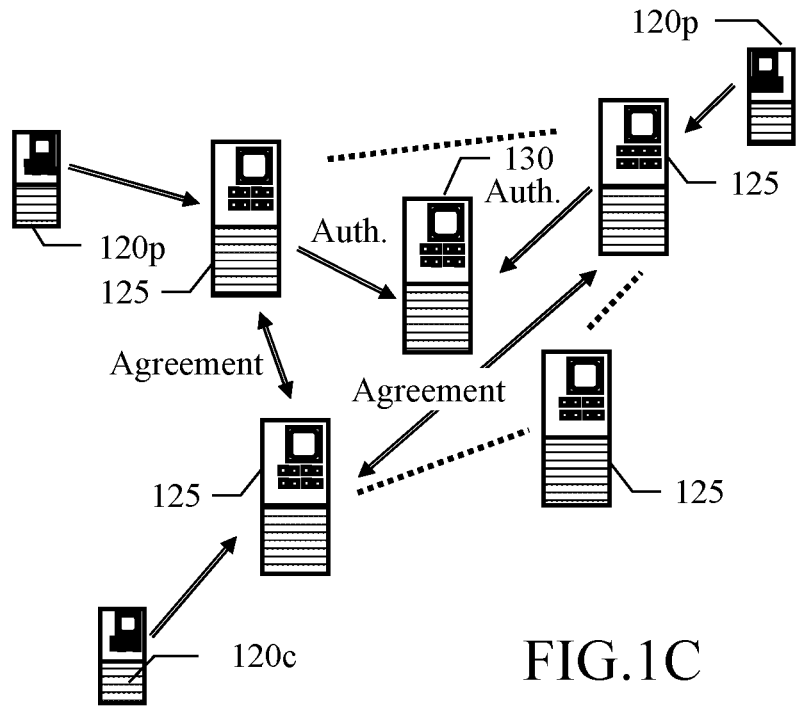

Moving to FIG. 1C, the service providers notify the collaboration authority about authorizations that have been granted to receive data that are shared by them (as agreed upon among the corresponding service providers). Particularly, the central server 125 (sharing the data of one or more producer edge servers 120p thereof) sends an (authorization) notification to the collaboration server 130, indicating that one or more (consumer) edge servers of other service providers, differentiated with the reference 120c, are authorized to receive the data of one or more categories provided by one or more of its producer edge serves 120 (as a result of corresponding agreements being reached).

Figure 1D:
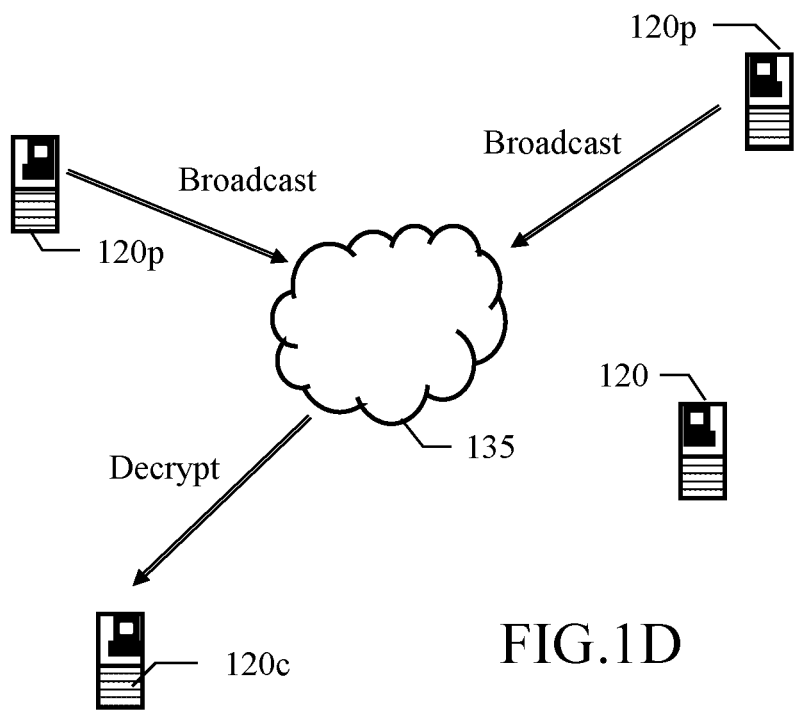

Moving to FIG. 1D, the collaboration server 130 establishes one or more (collaboration) channels 135 for sharing the data (locally). Particularly, each collaboration channel 135 (only one shown in the figure) is among one or more producer edge servers 120p and one or more consumer edge servers 120c authorized to receive the data of one or more corresponding categories. For example, the collaboration channel 135 is implemented by associating corresponding encryption keys to the consumer computing systems of each category of the data that are shared in each collaboration channel. Each producer edge server 120p is provided with all the encryption keys for the categories of the data that are shared by it; each consumer edge server 120c is instead provided only with the encryption keys for the categories of the data that it is authorized to receive. The collaboration channel 135 is then used by the producer edge servers 120p to provide the data (collected locally by its collection devices 115, possibly after their pre-processing) to the corresponding consumer edge servers 120c. For example, each producer edge server 120p encrypts the data of the categories to be shared with the corresponding encryption keys and then broadcasts, or multicasts, them to all the consumer edge servers 120*c* of the communication channel 135; however, each consumer edge server 120*c* may decrypt only the data of the categories that is authorized to receive (by means of the corresponding encryption keys).

The above-mentioned solution allows sharing data among different service providers at the level of their edge servers in a peer-to-peer (P2P) way.

In this way, it is possible to reduce the number of collection devices, without substantially impairing the physical proximity of the edge servers thereto; indeed, the consumer edge servers may now receive the data of the required categories without the corresponding collection devices, by exploiting the ones of the producer edge servers.

The resulting reduced distribution of the collection devices limits their proliferation among the service providers (with a corresponding saving for them that should transfer into a reduction of costs of their services) and their dissemination in the environment (with a reduction of any visual impacts thereof).

Moreover, it is possible to increase the amount of data that is available to each service provider (at least in locations where it is lacking of the corresponding collection devices). This has a beneficial impact on the quality of the results obtained by the processing of the data, and then of the corresponding services that are offered by the service provider.

This also allows the aggregation of the data that are collected by different service providers in a time effective and reliable way. Indeed, this operation is performed at the consumers edge servers (and then shortly after the collection of the data on the field by the collection devices of the consumer/producer edge servers); moreover, the collaboration server coordinates the collaboration among the edge servers of the different service providers centrally, so as to guarantee it (for example, in terms of authenticity, integrity, non-repudiation, confidentiality and so on of the data that are shared).

In this way, it is possible to have high quality and reliability with low response time of the services (especially important for critical applications).

For example, a power plant may exploit data collected by a weather company (measuring wind, temperature, rain and so on) and data collected by a geological agency (measuring snow, humidity, ice, fire, seismic waves and so on) to plan the production of energy (even without having any dedicated collection devices). As another example, a security company of an airport may combine data collected by its collection devices (providing biometrical information of persons having suspicious behaviors) with similar data received from a bank to promptly detect possible threats (and then intervene immediately). As a further example, a smartphone may collect vital parameters of its users (such as body temperature, blood pressure, heart rate and so on) and it may receive pollution data and weather data collected by corresponding meters close to the users, and combine them to detect possible risks for a health of the users according to contingent environment conditions.

Figure 2:
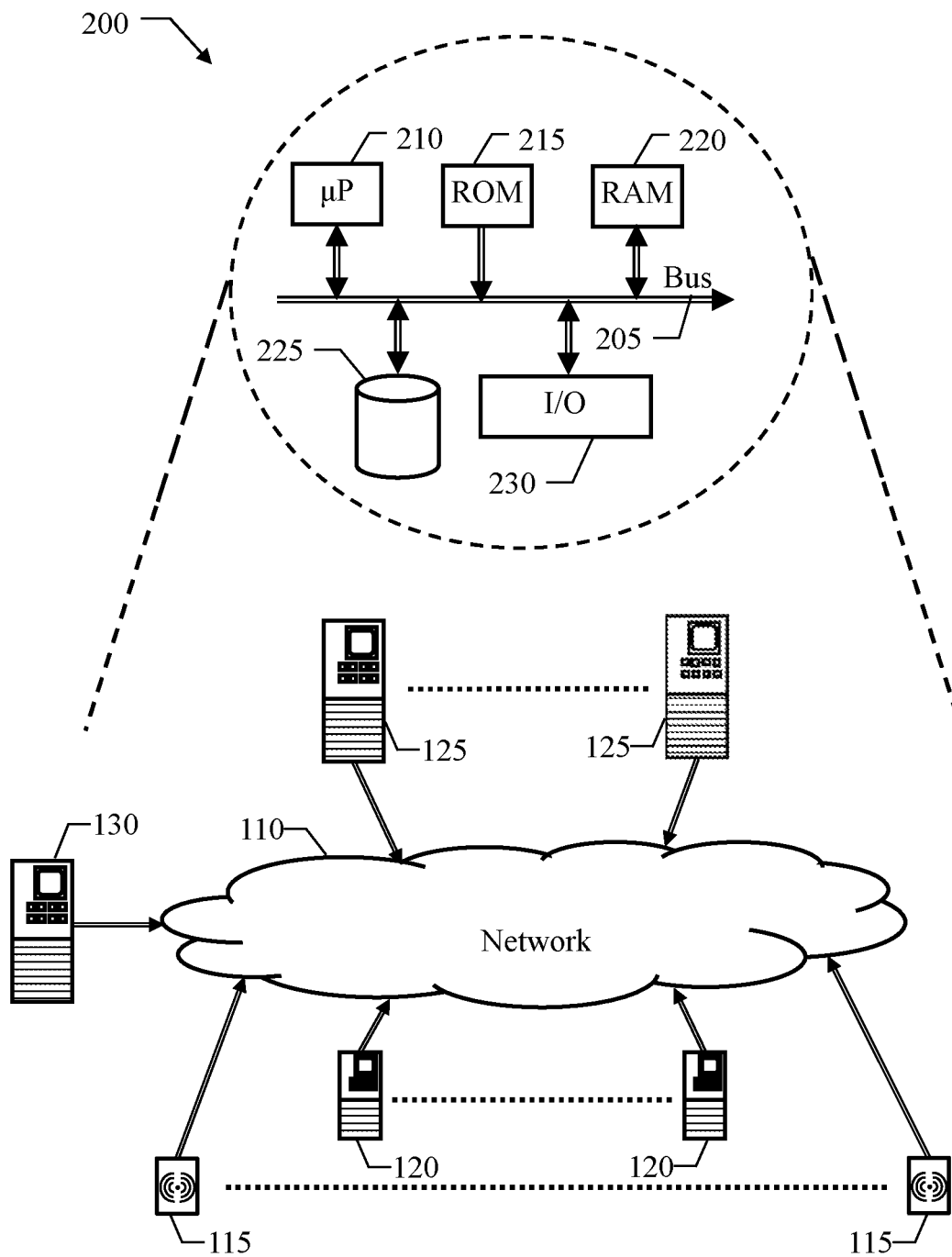
FIG. 2 shows a schematic block diagram of a computing infrastructure wherein the solution according to an embodiment of the present disclosure may be practiced.

With reference now to FIG. 2, a schematic block diagram is shown of a computing infrastructure 200 wherein the solution according to an embodiment of the present disclosure may be practiced.

The computing infrastructure 200 comprises the collection devices 115, the edge servers 120 and the central servers 125 (of the different service providers) and the collaboration server 130, which are connected among them through the network 110.

For example, the collection devices 115 comprise IoT devices, such as objects different from computers (and traditionally non-Internet-enabled) that are provided with Internet connectivity. Particularly, the collection devices 115 comprise sensors of the corresponding service providers (for collecting data of specific categories) that are embedded into everyday objects (such as appliances, vehicles, tools and so on); in addition or in alternative, the collection devices 115 comprise personal devices of the users of the service providers (for example, smartphones, tablets and so on), wherein one or more apps of the service providers are installed (for collecting data of specific categories via corresponding sensors of the personal devices). The edge servers 120 may be physical machines that are connected directly to access providers (not shown in the figure) providing access to the Internet for the corresponding collection devices (so as to be in physical proximity thereto). The central servers 125 may be virtual machines that are implemented in the central data centers (not shown in the figure) of the corresponding service providers (anywhere in the Internet). The collaboration server 130 may be a virtual machine that is implemented in a data center (not shown in the figure) of the collaboration authority.

Each of the above-mentioned computing machines (collection devices 115, edge servers 120, central servers 125 and collaboration server 130) comprises several units that are connected among them through a bus structure 205 with one or more levels (with an architecture that is suitably scaled according to the type of the computing machine 115-130). Particularly, a microprocessor (μP) 210, or more, provides a logic capability of the computing machine 115-130; a non-volatile memory (ROM) 215 stores basic code for a bootstrap of the computing machine 115-130 and a volatile memory (RAM) 220 is used as a working memory by the microprocessor 210. The computing machine 115-130 is provided with a mass-memory 225 for storing programs and data (for example, a flash $E^2$PROM for each collection device 115, redundant SSDs for each edge server 120 and storage devices of the corresponding data center for each central server 125 and for the collaboration server 130). Moreover, the computing machine 115-130 comprises a number of controllers for peripherals, or Input/Output (I/O) units, 230; for example, as far as relevant to the present disclosure the peripherals 230 of each collection device 115 comprise a sensor for collecting the data of the corresponding category (such as a camera, a thermometer, a hygrometer, a radar and so on), a wireless network adapter of the Wi-Fi type and/or a mobile telephone transceiver for accessing the network 110 via access points and base stations, respectively, the peripherals 230 of each edge server 120 comprise a network adapter for accessing the network 110, and the peripherals 230 of each central server 125 and of the collaboration server 130 comprise a network adapter for plugging the central/collaboration server 125, 130 into the corresponding data center and then connecting it to a console of the data center for its control (for example, a personal computer, also provided with a drive for reading/writing removable storage units, such as of USB type) and to a switch/router sub-system of the data center for its communication with the network 110.

Figure 3:
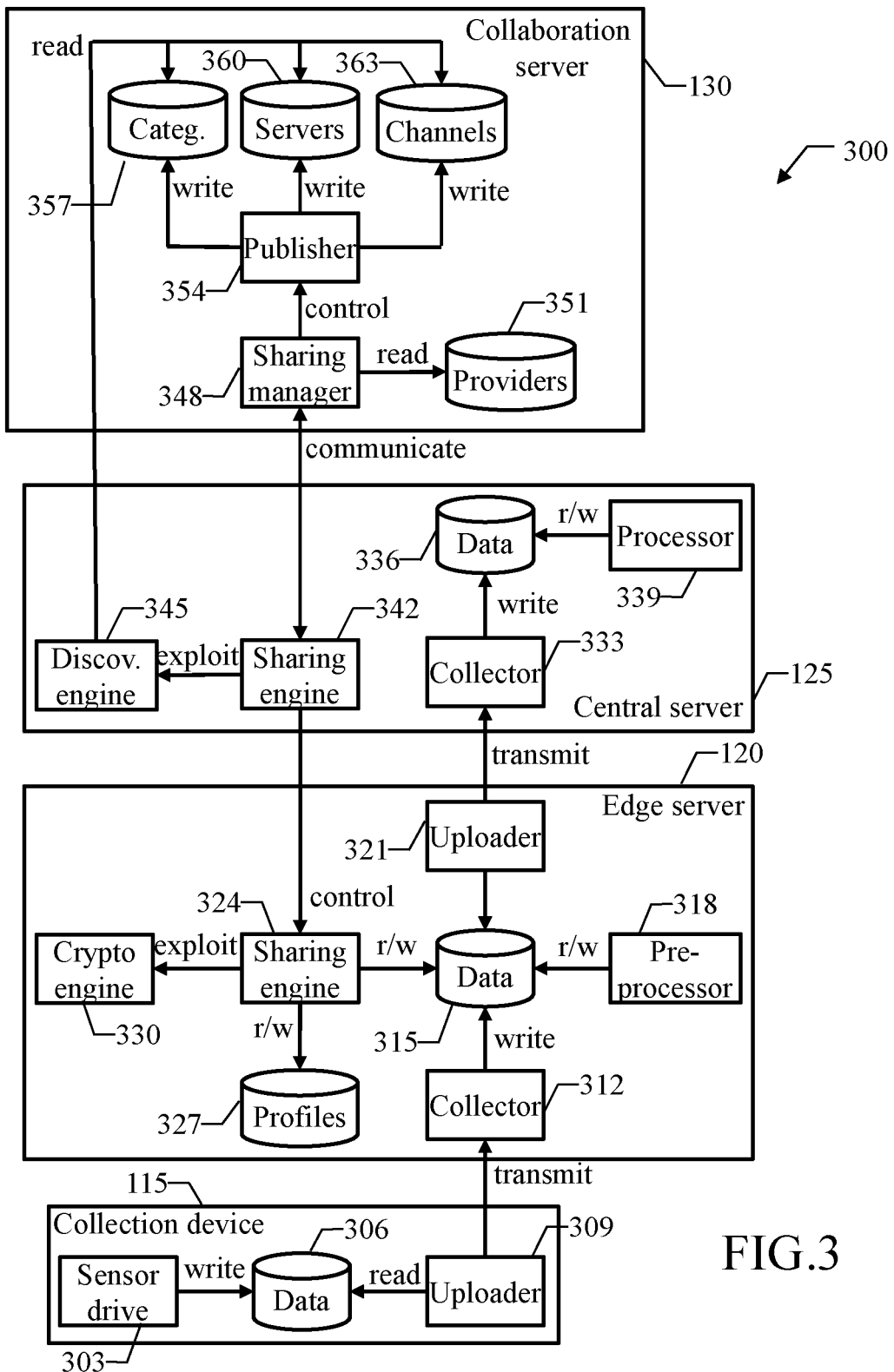
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300. The software components 300 are typically stored in the mass memory and loaded (at least partially) into the working memory of the relevant computing machine when the programs are running, together with an operating system and possible other application programs (not shown in the figure). The programs are initially installed into the mass memory, for example, from removable storage units or from the network. In this respect, each program may be a module, segment or portion of code, which comprises one or more executable instructions for implementing the specified logical function.

Starting from each collection device 115 (only one shown in the figure), it comprises the following components.

A sensor drive 303 drives its sensor (for collecting the data of the corresponding category); for example, the data are digital images, measures of temperature, humidity, pressure and so on. The sensor drive 303 writes a data buffer 306, which stores the data that have been collected by the sensor drive 303 temporarily. An uploader 309 uploads these data, by reading them from the data buffer 306 and then transmitting them to the corresponding edge server 120.

Moving to each edge server 120 (only one shown in the figure), it comprises the following components.

A collector 312 receives the data that have been collected by the corresponding collection devices 115 (from the uploader 309 of each one of them). The collector 312 writes a data repository 315, which stores the data that have been collected by the corresponding collection devices 115. A pre-processor 318 pre-processes these data; for this purpose, the pre-processor 318 reads the data repository 315 to retrieve the (raw) data as received; moreover, the pre-processor 318 writes the data repository 315 to save the (pre-processed) data so obtained. For example, the pre-processed data are biometrical parameters extracted from digital images of persons, dangerous conditions based on a combination of health parameters of persons and environment parameters of their locations, and so on. An uploader 321 uploads the raw and/or pre-processed data, by reading them from the data repository 321 and then transmitting them to the corresponding central server 125; moreover (not shown in the figure), the uploader 321 may also transmit the pre-processed data (when already useful) to corresponding client devices in proximity thereto, such as the personal devices of the corresponding users.

In the solution according to an embodiment of the present disclosure, a sharing engine 324 controls the sharing of the data that are available at the edge server 120 (the raw data that have been collected by the corresponding collection devices 115 and/or the pre-processed data that have been obtained by the pre-processor 318). For this purpose, the sharing engine 324 reads/writes the data repository 315 and a profile repository 327. The profile repository 327 contains corresponding (collaboration) profiles for accessing the collaboration channels to which the edge server 120 is enrolled (either as a producer or as a consumer). For example, each collaboration profile comprises a list of the categories of the data that are shared through the collaboration channel. In turn, the list has an entry for each of these categories. The entry stores a role flag indicating whether the edge server 120 is the producer or the consumer of these data and the encryption key to be used to encrypt (producer) or to decrypt (consumer) them (with the entry that is empty if the edge server 120 is not enrolled to the category neither as producer nor as consumer). The sharing engine 324 exploits a cryptographic engine 330, which is used to encrypt/decrypt the data that are shared. The sharing engine 324 communicates with the sharing engine of the other edge servers (not shown in the figure) of the collaboration channel to which it is enrolled.

Moving to each central server 125 (only one shown in the figure), it comprises the following components.

A collector 333 receives the (raw/pre-processed) data that have been provided by the corresponding edge servers 120 (from the uploader 321 of each one of them). The collector 333 writes a data repository 336, which stores these data. A processor 339 processes the data (it performs their whole processing in case of raw data or it completes their processing in case of pre-processed data); for this purpose, the processor 339 reads the data repository 336 to retrieve the (raw/pre-processed) data as received; moreover, the processor 339 writes the data repository 336 to save the (processed) data so obtained. For example, the processed data are identification information relating to suspicious persons recognized from their biometrical parameters, medical information relating to patients in dangerous conditions, and so on; the processed data may then be used for any desired purpose, for example, to coordinate actions to be taken for neutralizing the suspicious persons, to provide medical aid to the patients and so on.

In the solution according to an embodiment of the present disclosure, a sharing engine 342 controls the sharing of data by the corresponding edge servers 120 through the corresponding collaboration channels (either for providing them to the (consumer) edge servers 120 of other service providers or for receiving them from the (producer) edge servers 120 of other service providers). For this purpose, the sharing engine 342 exploits a discovery engine 345, which is used to discover the data that are available to be shared (published by the collaboration server 130 as described in the following). The sharing engine 342 communicates with the sharing engine of each central server 125 to negotiate the sharing of data, either to be provided or to be received (not shown in the figure). Moreover, the sharing engine 342 controls the sharing engine 324 of each corresponding edge server 120.

Moving to the collaboration server 130, it comprises the following components.

A sharing manager 348 manages the sharing of data among the edge servers 120 of the different service providers. For this purpose, the sharing manager 348 communicates with the sharing engine 342 of each central server 125. The sharing manager 348 reads a service provider repository 351, which identifies the service providers that are registered with the collaboration authority. For example, the service provider repository 351 has an entry for each service provider; the entry comprises a name of the service provider and an identifier of its central server (such as host name, IP address and so on). The sharing manager 348 controls a publisher 354, which writes a category registry 357, a server registry 360 and a channel registry 363 being published in the Internet. The category registry 357 indicates all the (shared) categories of the data that are available for sharing. For example, the category repository 357 has an entry for each of these categories. The entry contains a name of the category, a description thereof (for example, digital images of persons, body/environment temperatures, blood/environment pressures and so), a type of the corresponding values (for example, integer, character, array and so on) and a type of the corresponding data (for example, raw, pre-processed and on on). The server registry 360 indicates the (producer) edge servers 120 that are available to share their data (as recognized/certified by the collaboration authority). For example, the server repository 360 has an entry for each of these edge servers 120. The entry comprises an identifier of the edge server 120 (for example, host name, IP address and so on), the name of the corresponding service provider, a list of one or more managed categories (species) of data that the edge server 120 is available to share and a list of the collaboration channels to which the edge server 120 is enrolled (as producer). In turn, the list of these species has an entry for each of them. The entry stores the name of the species, the category of the corresponding data, and one or more (data) characteristics relating to the data, for example, location of the edge server 120 or of the corresponding collection devices 115 (such as GPS coordinates, geographical name and the like), accuracy, security level, refresh rule and so on. The channel registry 363 indicates the collaboration channels that are established among the edge servers 120 of the different service providers (for example, each for a corresponding theme, such as environment, health, security and so on). For example, the channel repository 363 has an entry for each collaboration channel. The entry comprises a list of the categories of the data that are shared in the collaboration channel and a list of the (producer) edge servers 120 that provide these data. In turn, the list of these edge servers 120 has an entry for each of them; the entry stores a list of the categories of the data that are provided by the edge server 120 in the collaboration channel. The category registry 357, the server registry 360 and the channel registry 363 are read by the discovery engine 345 of each central server 125; moreover, the channel registry 363 is also read by the sharing engine 324 of each edge server 120 (not shown in the figure).

Figure 4A:
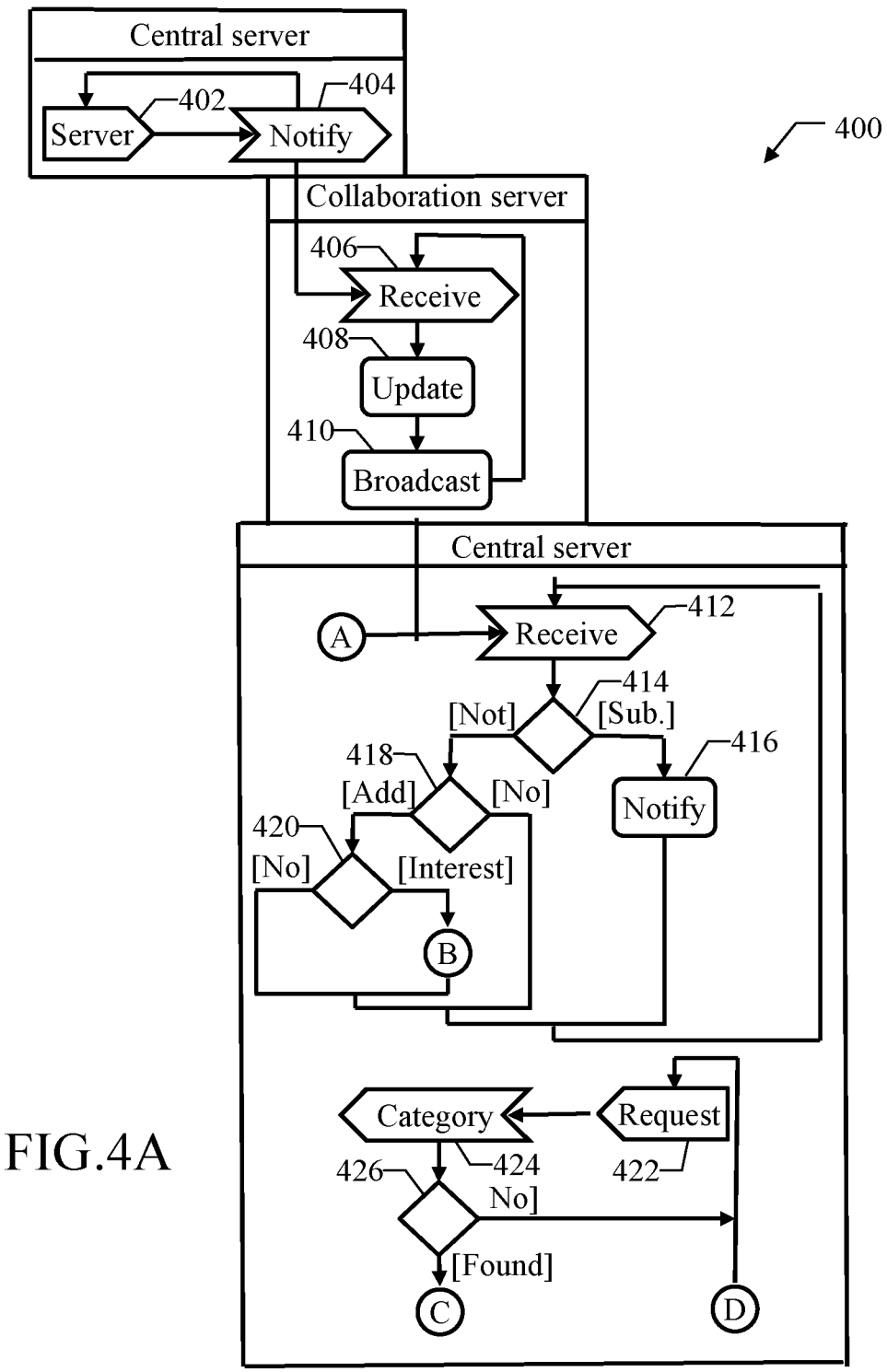
FIG. 4A-FIG. 4C show an activity diagram describing the flow of activities relating to an implementation of the solution according to an embodiment of the present disclosure.
Figure 4B:
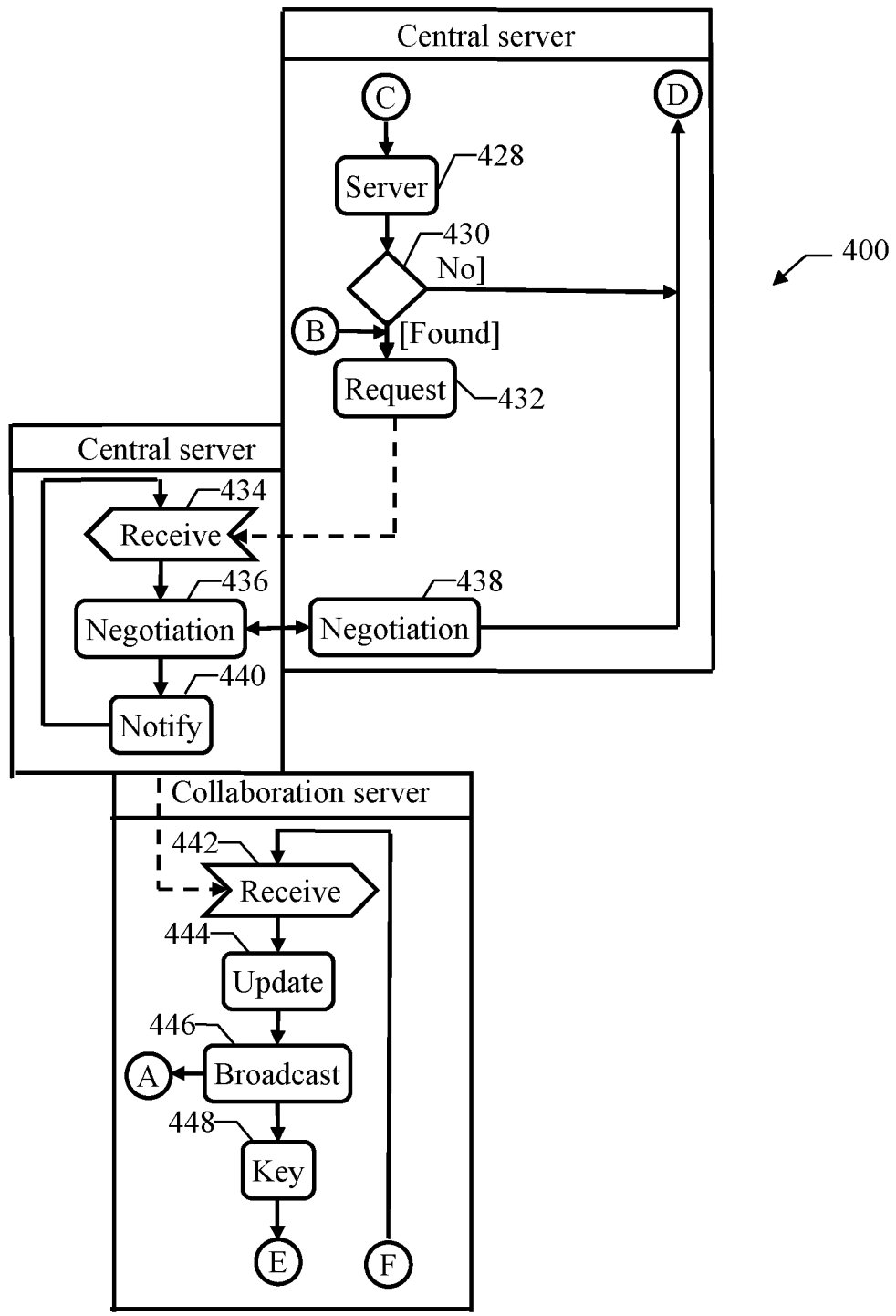
Figure 4C:
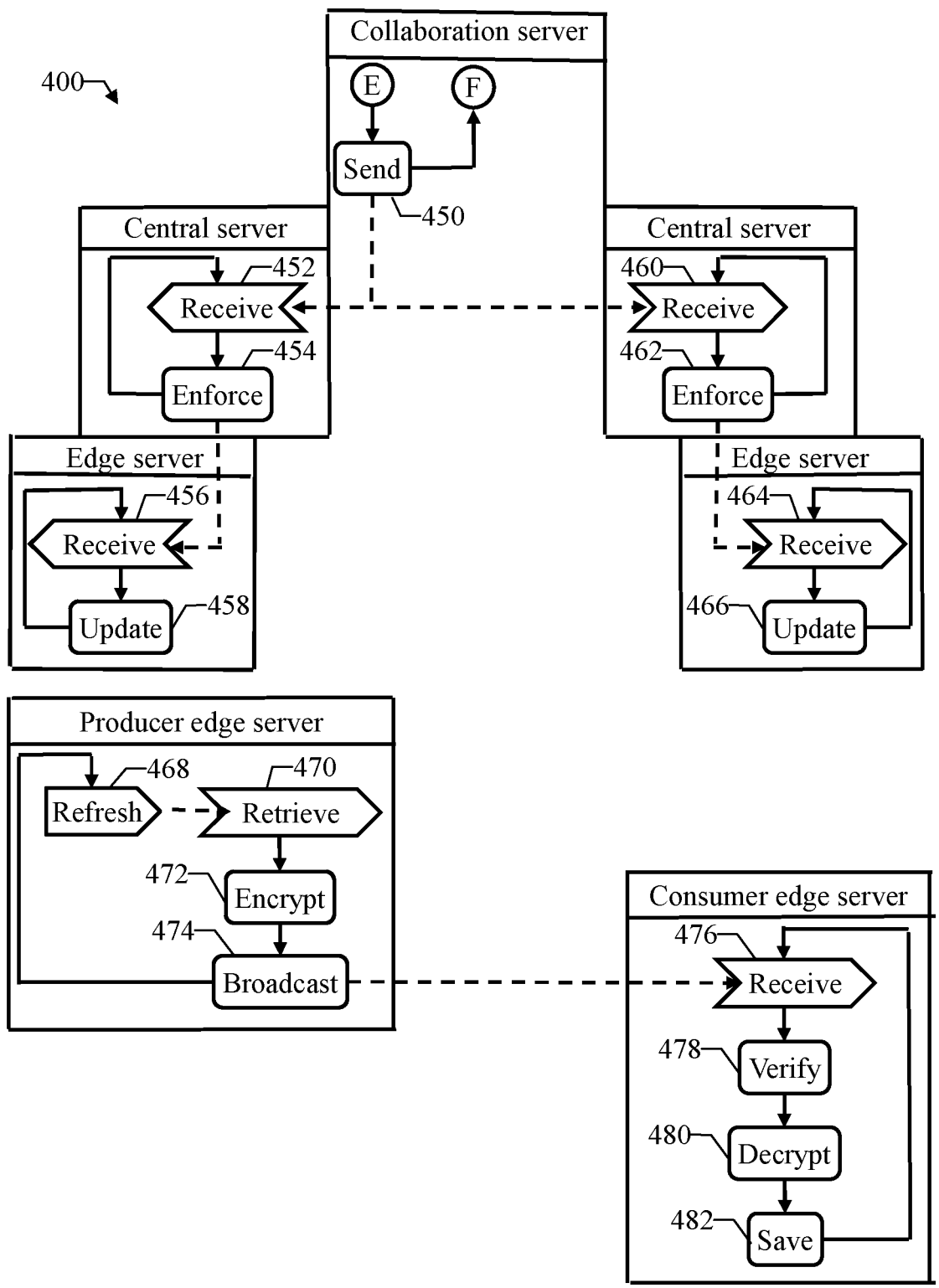

With reference now to FIG. 4A-FIG. 4C, an activity diagram is shown describing the flow of activities relating to an implementation of the solution according to an embodiment of the present disclosure.

In this respect, each block may correspond to one or more executable instructions for implementing the specified logical function on the relevant computing machines. Particularly, the diagram represents an exemplary process that may be used to share data among the edge servers of different service providers with a method 400.

The process passes from block 402 to block 404 in the swim-lane of the central server of a generic service provider whenever its sharing engine receives an (availability) command for changing the availability of an edge server (or more) of the service provider to share data that are available thereto (for example, entered by a system administrator thereof). For example, the change may relate to the addition of a (producer) edge server, the addition of a (shared) category (or more) of a (producer) edge server, their change, deletion and so on. In response thereto, the sharing engine sends a corresponding (availability) notification to the collaboration server (relating to the producer edge servers and/or the shared categories). The process then returns to the block 402 waiting for a next availability command.

Moving to the swim-lane of the collaboration server, the sharing manager at block 406 receives this notification. The sharing manager at block 408 then commands the publisher to update the category registry and/or the server registry accordingly. Moreover, the sharing manager at block 410 broadcasts, or multicasts, the same notification to the central servers of all the other service providers that are registered with the collaboration authority (as indicated in the corresponding repository). The process then returns to the block 406 waiting for a next notification.

Moving to the swim-lane of the central server of each other service provider, the sharing engine at block 412 receives this notification. The flow of activity branches at block 414 according to its content. If the notification relates to the change of a (subscribed) category (or more) of the data that are shared in a collaboration channel to which one or more (consumer) edge servers of the service provider are enrolled to receive them, the sharing engine at block 416 notifies each of these edge servers, so as to allow its sharing engine to react accordingly, not shown in the figure (for example, by adapting to a change of the format of the data that are received). Conversely, the flow of activity further branches at block 418. If the notification relates to the addition of a (new) category (or more) of the data that have become available to be shared by the corresponding (producer) edge server (possible added as well), the flow of activity further branches at block 420 according to a corresponding interest of the service provider in it. If the sharing engine receives a command for subscribing to the category of the data provided by this edge server (for example, entered by the system administrator in response to a corresponding notification, such as via instant message or e-mail), the process continues to block 432 (described in the following). The process then returns to the block 412 waiting for a next notification from the block 416, directly from the block 418 (if the notification does not relate to the addition of a new category to which the service provider is not subscribed), and from the block 420 after requesting the subscription to the new category or directly if the service provider is not interested in it.

The process passes from block 422 to block 424 in the swim-lane of the central server of a generic service provider (the same as above for the sake of simplicity) whenever its sharing engine receives a command for subscribing to a category of data (or more) for a (consumer) edge server (or more), which is not associated with any collection device of the service provider for collecting these data (for example, entered by the system administrator). In response thereto, the discovery engine searches for this category of data in the corresponding registry. The flow of activity branches at block 426 according to a result of this search. If the category has been discovered (meaning that the corresponding data are offered for sharing by one or more edge servers of the other service providers), the discovery engine at block 428 determines the producer edge servers that are offering the data of the category and the collaboration channels where this already happens, if any (by querying the server registry and the channel registry). The discovery engine then determines whether any producer edge servers and possible collaboration channels exist meeting specific requirements (defined in one or more policies or entered manually by the system administrator), for example, in terms of corresponding service provider, species of the data and so on; if so, the discovery engine selects a best one of them (for example, for the closest producer edge server). The flow of activity branches at block 430 according to a result of this search. If a suitable producer edge server has been found, the process descends into block 432; the same point is also reached after the block 420 in case of interest of the service provider to the new category of the (possibly new) producer edge server. In both cases, the sharing engine now submits a request for sharing the corresponding data to the central server of the producer edge server.

Moving to the swim-lane of this central server, the sharing engine at block 434 receives this request. A negotiation is then started between the two central servers, which negotiation involves the exchange of one or more messages with corresponding offers/requests by the central server of the producer edge server at block 436 and by the central server of the consumer edge server at block 438. For example, the negotiation is based on corresponding requirements of the two service providers (defined in one or more policies or entered manually by their system administrators), for example, in terms of corresponding characteristics of the data that may be provided and that are to be received, fees required for providing the data and offered for receiving the data, and so on). In the swim-lane of the central server of the consumer edge server, the process then returns to the block 422 waiting for a next subscription request from the block 438, from the block 426 if the category has not been discovered (meaning that the corresponding data are not offered for sharing by any edge servers of the other service providers) or from the block 430 if not suitable producer edge server has been found. Assuming that an agreement for sharing the data has been reached between the two service providers, the sharing engine of the central server of the producer edge server at block 440 notifies the collaboration server accordingly. The process then returns to the block 434 waiting for a next request of sharing data.

Moving to the swim-lane of the collaboration server, the sharing manager at block 442 receives this notification. In response thereto, the sharing manager at block 444 commands the publisher to update the channel registry accordingly. Particularly, if necessary the publisher creates a new collaboration channel (for the producer edge server); in any case, the publisher adds the shared category and the consumer edge server to the collaboration channel. Moreover, the sharing manager at block 446 broadcasts, or multicasts, the same notification to the central servers of all the other service providers that are registered with the collaboration authority (as indicated in the corresponding repository). The sharing engine of the central server of each other service provider receives this notification at block 412, so as to perform the same operations described above. The sharing manager at block 448 then generates the encryption key to be used to share the data in the collaboration channel from the producer edge server to the consumer edge server. The sharing manager at block 450 sends the encryption key to the central server of the producer edge server and to the central server of the consumer edge server. The process then returns to the block 442 waiting for a next notification.

Moving to the swim-lane of the central server of the producer edge server, the sharing engine at block 452 receives the encryption key. In response thereto, the sharing engine at block 454 enforces the corresponding sharing of data (providing) on the producer edge server. For this purpose, the sharing engine sends a corresponding notification to the producer edge server, indicating the collaboration channel, the category of data to be shared and the corresponding encryption key. The process then returns to the block 452 waiting for a next notification. Moving to the swim-lane of the producer edge server, the sharing engine at block 456 receives this notification. In response thereto, the sharing engine at block 458 updates the profile repository accordingly. The process then returns to the block 456 waiting for a next notification.

At the same time, in the swim-lane of the central server of the consumer edge server the sharing engine at block 460 receives the encryption key as well. In response thereto, the sharing engine at block 462 enforces the corresponding sharing of data (receiving) on the consumer edge server. For this purpose, the sharing engine sends a corresponding notification to the consumer edge server, indicating the collaboration channel, the category of data that have been shared and the corresponding encryption key. The process then returns to the block 460 waiting for a next notification. Moving to the swim-lane of the consumer edge server, the sharing engine at block 464 receives this notification. In response thereto, the sharing engine at block 466 updates the profile repository accordingly. The process then returns to the block 464 waiting for a next notification.

In a completely independent way, the process passes from block 468 to block 470 in the swim-lane of each consumer edge server as soon as a (refresh) event triggering the refresh of the data available thereto to be shared in a corresponding collaboration channel occurs (as indicated by the corresponding refresh rule in the profile repository), for example, periodically, in response to any change thereof and so on. At this point, the sharing engine retrieves the data to be shared from the data repository; for example, for each category of the data to be shared the sharing engine retrieves the last available value thereof or the last available ones in a pre-defined timeframe (as indicated by the corresponding refresh rule again). The sharing engine at block 472 commands the encryption engine to encrypt the data of each category with the corresponding encryption keys (retrieved from the profile repository). The sharing engine at block 474 prepares a record for sharing in the collaboration channel. The record comprises the (encrypted) data so obtained for each category (signed with a private key of the producer edge server), the identifier of the producer edge server and a digital certificate thereof; the sharing engine than publishes the record in the collaboration channel, for example, by broadcasting, or multicasting, it to all the other edge servers of the collaboration channel (retrieved from the corresponding repository). At the same time, the sharing engine may also save an indication of the performed activity into a log, which is shared with the corresponding central server for tracking purposes. The process then returns to the block 468 waiting for a next refresh event.

Moving to the swim-lane of each consumer edge server, the sharing engine at block 476 receives every record that has been shared in each collaboration channel to which the consumer edge server is enrolled. The sharing engine at block 478 verifies that the record has been actually provided by a producer edge server of the collaboration channel (as indicated in the channel repository) according to its digital signature. Assuming that the record is genuine, the sharing engine at block 480 commands the encryption engine to decrypt the data of each category the consumer edge server is authorized to receive with the corresponding encryption key (as indicated in the profile repository). The sharing engine at block 482 saves the (decrypted) data so obtained into the data repository. The process then returns to the block 476 waiting for a next receipt of data.

In this way, it is possible to discriminate the sharing of data in each collaboration channel. Indeed, even if the producer edge server broadcasts the data to all the consumer edge servers indiscriminately, only the edge servers being authorized to receive them may decrypt the data.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (not limited to the recited items), the terms based on, dependent on, according to, function of and the like should be intended as a non-exclusive relationship (with possible further variables involved), the term a/a should be intended as one or more items (unless expressly indicated otherwise), and the term means for (or any means-plus-function formulation) should be intended as any structure adapted or configured for carrying out the relevant function.

For example, an embodiment provides a method for sharing data among a plurality of service providers. However, the data may be of any type (for example, raw data, pre-processed data and so on) and they may be shared among any number and type of service providers (for example, of cloud, SOA, client/server and so on type).

In an embodiment, each of the service providers has a plurality of collection devices. However, the collection devices may be in any number and of any type (for example, sensors of the service providers, personal devices of their users and so on).

In an embodiment, the collection devices are for collecting data of one or more data categories. However, the data categories may be in any number and of any kind (for example, partial, different and additional data categories with respect to the ones mentioned above).

In an embodiment, each of the service providers has one or more edge computing systems. However, the edge computing systems may be in any number and of any type (for example, physical machines, virtual machines and so on).

In an embodiment, each of the edge computing system is for pre-processing data that are available thereto, comprising the data that have been collected by a corresponding group of the collection devices. However, the collection devices of the group may be in any number and arranged in any way (for example, connected to the edge computing system directly, via one or more hops and so on); moreover, the data may be pre-processed in any way (for example, with partial, different and additional operations with respect to the ones mentioned above).

In an embodiment, each of the service providers has a central computing system for processing the data that have been provided by the edge computing systems. However, the central computing system may be of any type (for example, a virtual or physical machine implemented in a data center, a stand-alone machine and so on); moreover, the data may be pre-processed in any way (for example, with partial, different and additional operations with respect to the ones mentioned above on raw data, pre-processed data, their combination and so on).

In an embodiment, each of the edge computing systems is closer to the corresponding collection devices than the central computing system. However, the distance of the edge computing system and of the central computing system from the collection devices may have any value (either in relative or absolute terms, measured in any way, such as by physical/network distances, number of hops, and so on).

In an embodiment, the method comprises the following steps under the control of a collaboration computing system. However, the collaboration computing system may be of any type (see below).

In an embodiment, the method comprises receiving (by the collaboration computing system) availability notifications from one or more of the central computing systems. However, the availability notifications may be in any number and received in any way (for example, commands, messages and so on).

In an embodiment, each of the availability notifications is indicative of an availability of at least one producer computing system (of the edge computing systems of the corresponding service provider) to share the data of at least one shared category (of the data categories of the data that are available to the producer computing system). However, each availability notification may relate to any number of producer computing systems and shared categories, and it may be defined in any way (for example, by partial, different and additional information with respect to the one mentioned above, either individually or in any combination thereof).

In an embodiment, the method comprises receiving (by the collaboration computing system) authorization notifications from one or more of the central computing systems. However, the authorization notifications may be in any number and received in any way (for example, commands, messages and so on).

In an embodiment, each of the authorization notifications is indicative of an authorization of at least one consumer computing system (of the edge computing systems of the other service providers) to receive the data of at least one of the shared categories provided by at least one of the producer computing systems of the corresponding service provider. However, each authorization notification may relate to any number of consumer computing systems and shared categories, and it may be defined in any way (for example, by partial, different and additional information with respect to the one mentioned above, either individually or in any combination thereof); moreover, the authorization notification may be provided in response to a corresponding negotiation among the corresponding service providers, for every service provider meeting pre-defined conditions, indiscriminately for all the service providers and so on.

In an embodiment, the method comprises establishing (by the collaboration computing system) one or more collaboration channels. However, the collaboration channels may be in any number and of any type (for example, for partial, different and additional themes with respect to the ones mentioned above, each one made trusted in any way, such as resistant to both overhearing and tampering, to overhearing only, to tampering only and so on).

In an embodiment, each of the collaboration channels is among one or more of the producer computing systems and one or more of the consumer computing systems that are authorized to receive the data of one or more of the corresponding shared categories. However, each collaboration channel may comprise any number of producer computing systems and consumer computing systems, and it may be used to share data of any number of shared categories.

In an embodiment, each of the collaboration channels is for use by each of the producer computing systems of the collaboration channel to provide the data of the corresponding shared categories to the consumer computing systems of the collaboration channel. However, the data may be shared in any way (for example, by broadcasting the data in encrypted form for their decryption only by the consumer computing systems that are authorized to receive them, by transmitting the data only to the consumer computing systems that are authorized to receive them and so on).

Further embodiments provide additional advantageous features, which may however be omitted at all in a basic implementation.

Particularly, in an embodiment the method comprises associating (by the collaboration computing system) corresponding encryption keys to the consumer computing systems of each of the shared categories in each of the collaboration channels. However, the encryption keys may be of any type (for example, symmetric keys, asymmetric keys and so on) and they may be associated with the shared categories in any way (for example, by the collaboration computing systems, by the corresponding central computing systems, with each consumer computing system having a corresponding encryption key for each of its shared categories or a common encryption key for all its shared categories of each consumer computing system, and so on).

In an embodiment, each of the encryption keys is for use by the corresponding producer computing system to encrypt the data of the shared category into encrypted data to be provided in the collaboration channel to all the consumer computing systems thereof. However, the data may be encrypted in any way (for example, with corresponding symmetric keys shared with the consumer computing systems, with public keys of the consumer computing systems and so on).

In an embodiment, each of the encryption keys is for use by each of the consumer computing systems of the collaboration channel authorized to receive the data of the shared category to decrypt the encrypted data. However, the encrypted data may be decrypted in any way (for example, with the same symmetric key shared with the producer computing system, with the private key of the consumer computing system and so on).

In an embodiment, the method comprises generating (by the collaboration computing system) the encryption keys. However, the possibility is not excluded of providing the encryption keys in any other way (for example, by generating them by the consumer edge computing systems or by their central computing systems, by using already existing pairs of private/public keys and so on).

In an embodiment, the method comprises sending (by the collaboration computing system) the encryption keys of the corresponding shared categories to the central computing systems of each of the producer computing systems and of each of the consumer computing systems for distribution thereto. However, the possibility is not excluded of exchanging the encryption keys in any other ways (for example, distributing them by the producer edge computing systems, by their central computing systems and so on).

In an embodiment, the method comprises receiving (by the collaboration computing system) each of the authorization notifications in response to an agreement between the central computing system of the corresponding producer computing system and the central computing system of the corresponding consumer computing system to share the data of the corresponding shared category. However, the agreement may be reached in any way (for example, automatically, requiring a manual confirmation, manually, according to any number and type of requirements, and so on).

In an embodiment, the method comprises providing (by the collaboration computing system) sharing information comprising an indication of the producer computing systems and the corresponding shared categories to the central computing systems. However, the sharing information may be of any type (for example, with partial, different and additional information with respect to the one mentioned above, either individually or in any combination thereof) and they may be provided in any way (for example, published, broadcasted, transmitted and so on).

In an embodiment, the sharing information is for use by each of the central computing systems to discover the producer computing systems of each of the shared categories whose data are to be received by the consumer computing systems of the corresponding service provider. However, the producer computing systems of interest may be discovered in any way (for example, according to partial, different and additional requirement with respect to the ones mentioned above, either individually or in any combination thereof).

In an embodiment, the method comprises publishing (by the collaboration computing system) the sharing information in response to each of the availability notifications. However, the sharing information may be published in any way (for example, in any number and type of registries, at any shared location, by using a data sharing service, and so on), even not in response to each availability notification (for example, periodically, after any change of a pre-defined amount and so on).

In an embodiment, the method comprises broadcasting (by the collaboration computing system) the availability notifications in response to the receiving thereof to the central computing systems. However, the availability notifications may be broadcasted in any way (for example, indiscriminately, directly and so on), even not in response to each availability notification (for example, periodically, after any pre-defined number thereof and so on).

In an embodiment, the data of each of the shared categories comprise the data that have been collected by the corresponding collection devices and/or the data that have been pre-processed by the corresponding producer computing system. However, these data may be of any type (for example, raw data being collected and/or received, pre-processed data being received and/or generated from collected raw data and/or from received pre-processed data, and so on).

In an embodiment, the collection devices comprise sensors of the corresponding service providers. However, the sensors may be in any number and of any type (for example, for sensing any value, stand-alone, embedded in any device, either of IoT type or not, and so on).

In an embodiment, the collection devices comprise IoT devices. However, the IoT devices may be of any type (for example, partial, different and additional IoT devices with respect to the ones mentioned above, either individually or in any combination thereof).

Some embodiments of the present invention are directed to a method for information sharing among IoT collaborative edge servers of different service providers using a trusted collaboration system, the method comprising governing by the collaboration authority a collaborative edge server registry, a collaboration channels registry, and a dimension categories registry, receiving by the collaboration authority a request from at least one of the service providers for adding a collaborative edge server to the collaborative edge server registry, sending by the collaboration authority a notification (e.g. by broadcasting) about the added collaborative edge server, receiving by the collaboration authority a request for adding a collaboration channel to the collaboration channels registry from one or more of the service providers, sending by the collaboration authority a notification (e.g. by broadcasting) about the added collaboration channel to one or more of the service providers, receiving by the collaboration authority a request from a service provider for subscribing at least one collaborative edge server to a collaboration channel, receiving by the collaboration authority a request from a service provider for adding/change of a dimension category to the dimension categories registry, and sending by the collaboration authority a notification (broadcast) about an added/changed dimension category to the service providers.

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the above-mentioned method. An embodiment provides a computer program product, which comprises one or more computer readable storage media that have program instructions collectively stored therein; the program instructions are readable by a computing system to cause the computing system to perform the same method. However, the computer program may be implemented as a stand-alone module, as a plug-in for a pre-existing software application (for example, a control module of the service provider) or directly therein. Moreover, the computer program may be executed on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means that are configured for performing the steps of the above-described method. An embodiment provides a system comprising a circuit (any hardware suitably configured, for example, by software) for performing each step of the above-described method. However, the system may comprise any number and type of computing machines (for example, of physical and/or virtual type) and it may be used in any computing environment, for example, based on a local, wide area, global, cellular or satellite network exploiting any type of (wired and/or wireless) connections; for example, the system may be the collaboration computing system, each central computing system, each edge computing system, or any combination thereof.

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for sharing data among a plurality of service providers, the method comprises:

receiving a set of availability notifications from a set of central computing systems, the availability notifications indicating an availability of a producer computing system to share data of a shared category and of data categories of data available to the producer computing system;

receiving authorization notifications from the set of the central computing systems, the authorization notifications indicating an authorization of a consumer computing system to receive the data of the shared category provided by a set of producer computing systems of a corresponding service provider; and establishing a set of collaboration channels among the set of producer computing systems and the consumer computing system authorized to receive the data of the shared category for use by producer computing system to provide the data of the shared category to the consumer computing system of a collaboration channel of the set of collaboration channels, wherein each of the producer computing systems encrypts data of categories to be shared with corresponding encryption keys and multicasts the data of the categories to be shared to all consumer edge servers of the collaboration channel and a record which comprises an identifier of a corresponding producer computing system and a digital certificate such that the data of the categories are shared among the consumer edge servers in a peer-to-peer (P2P) manner, each of the consumer edge servers verifies that the record has been provided by the corresponding producer computing system according to the digital certificate, and upon verification, decrypts the data of the categories, the corresponding service provider collects digital images and environmental measurements which are uploaded to a corresponding edge server, and the corresponding edge server extracts biometrical parameters from the digital images and the environmental measurements.

2. The computer-implemented method of claim 1, wherein:

the corresponding service provider has: (i) a plurality of collection devices for collecting data of a set of data categories; (ii) a set of edge computing systems for pre-processing data including the data being collected by a corresponding group of the collection devices; and (iii) a central computing system for processing the data being provided by the edge computing systems; and the edge computing systems are physically closer to corresponding group of the collection devices than the central computing system.

3. The computer-implemented method of claim 1, further comprising:

associating a set of encryption keys of each of the shared categories to a set of corresponding consumer computing systems in each of the collaboration channels;

wherein:

the encryption keys are for use by:

a corresponding producer computing system to encrypt the data of the shared category into encrypted data to be provided in the collaboration channel to the set of corresponding consumer computing systems, the set of corresponding consumer computing systems of the collaboration channels authorized to receive the data of the shared category for decrypting the encrypted data, and the set of the encryption keys are retrieved from a profile repository.

4. The computer-implemented method of claim 3, further comprising:

generating the set of encryption keys, and
sending the set of encryption keys of each of the shared categories to the set of central computing systems for distribution to corresponding producer computing systems and corresponding consumer computing systems.

5. The computer-implemented method of claim 1, further comprising:
receiving the authorization notifications is performed responsive to an agreement between a central computing system of a corresponding producer computing system and a central computing system of a corresponding consumer computing system to share the data of the shared category, and
the agreement requires a manual confirmation according to a predetermined type of requirements.

6. The computer-implemented method of claim 1, further comprising:
providing sharing information including an indication of the set of producer computing systems and of corresponding shared categories to the set of central computing systems for use by the set of central computing systems to discover the set of the producer computing systems of each of the shared categories whose data are to be received by the consumer computing systems of the corresponding service provider.

7. The computer-implemented method of claim 6, further comprising: responsive to each availability notification, publishing the sharing information using a data sharing service.

8. The computer-implemented method of claim 6, further comprising:
responsive to receiving an availability notification to the central computing systems, broadcasting the availability notification.

9. The computer-implemented method of claim 1, wherein the data of the shared category includes data collected by a corresponding group of collection devices and/or data being pre-processed by a corresponding producer computing system.

10. The computer-implemented method of claim 1, wherein the collection devices comprise sensors of the corresponding service provider.

11. The computer-implemented method of claim 1, wherein the collection devices comprise IoT devices.

12. The computer-implemented method of claim 1, wherein the plurality of service providers comprise a plurality of cloud service providers providing a pool of cloud services implemented by virtual computing resources allocated upon request to users, and the set of central computing systems comprise virtual machines implemented in central data centers.

13. A computer program product for sharing data among a plurality of service providers, the computer program product comprising a computer hardware readable storage medium having program instructions stored in the computer hardware readable storage medium, the program instructions readable by a collaborative computing system to cause the collaborative computing system to perform a method comprising:
receiving a set of availability notifications from a set of central computing systems, the availability notifications indicating an availability of a producer computing system to share data of a shared category and of data categories of data available to the producer computing system;
receiving authorization notifications from the set of the central computing systems, the authorization notifications indicating an authorization of a consumer computing system to receive the data of the shared category provided by a set of producer computing systems of a corresponding service provider; and
establishing a set of collaboration channels among the set of producer computing systems and the consumer computing system authorized to receive the data of the shared category for use by producer computing system to provide the data of the shared category to the consumer computing system of a collaboration channel of the set of collaboration channels,
wherein each of the producer computing systems encrypts data of categories to be shared with corresponding encryption keys and multicasts the data of the categories to be shared to all consumer edge servers of the collaboration channel and a record which comprises an identifier of a corresponding producer computing system and a digital certificate such that the data of the categories are shared among the consumer edge servers in a peer-to-peer (P2P) manner,
each of the consumer edge servers verifies that the record has been provided by the corresponding producer computing system according to the digital certificate, and upon verification, decrypts the data of the categories,
the plurality of service providers comprise a plurality of cloud service providers providing a pool of cloud services implemented by virtual computing resources allocated upon request to users,
the corresponding service provider collects digital images and environmental measurements which are uploaded to a corresponding edge server, and
the corresponding edge server extracts biometrical parameters from the digital images and the environmental measurements.

14. The computer program product of claim 13, wherein:
the corresponding service provider has: (i) a plurality of collection devices for collecting data of a set of data categories; (ii) one or more edge computing systems for pre-processing data including the data being collected by a corresponding group of the collection devices; and (iii) a central computing system for processing the data being provided by the edge computing systems; and
the edge computing systems are physically closer to the corresponding group of collection devices than the central computing system.

15. The computer program product of claim 13, wherein the method further comprises:
receiving the authorization notifications is performed responsive to an agreement between a central computing system of a corresponding producer computing system and a central computing system of a corresponding consumer computing system to share the data of the shared category, and
the agreement requires a manual confirmation according to a predetermined type of requirements.

16. The computer program product of claim 13, wherein the method further comprises:
providing sharing information including an indication of the set of producer computing systems and of corresponding shared categories to the set of central computing systems for use by the set of central computing systems to discover the set of producer computing systems of each of the shared categories whose data are to be received by the consumer computing systems of the corresponding service provider, and responsive to each availability notification, publishing the sharing information using a data sharing service.

17. The computer system of claim 13, wherein the method further comprises:

providing sharing information including an indication of the set of producer computing systems and of corresponding shared categories to the set of central computing systems for use by the set of central computing systems to discover the set of producer computing systems of each of the shared categories whose data are to be received by the consumer computing systems of the corresponding service provider, and responsive to each availability notification, publishing the sharing information using a data sharing service.

18. A computer system for sharing data among a plurality of service providers, the computer system comprising:

a processor set; and a computer hardware readable storage medium;

wherein:

the processor set is structured, located, connected, and/or programmed to run program instructions stored on the computer hardware readable storage medium; and the program instructions which, when executed by the processor set, cause the processor set to perform a method comprising:

receiving a set of availability notifications from a set of central computing systems, the availability notifications indicating an availability of a producer computing system to share data of a shared category and of data categories of data available to the producer computing system;

receiving authorization notifications from the set of the central computing systems, the authorization notifications indicating an authorization of a consumer computing system to receive the data of the shared category provided by a set of producer computing systems of a corresponding service provider; and establishing a set of collaboration channels among the set of producer computing systems and the consumer computing system authorized to receive the data of the shared category for use by producer computing system to provide the data of the shared category to the consumer computing system of a collaboration channel of the set of collaboration channels, wherein each of the producer computing systems encrypts data of categories to be shared with corresponding encryption keys and multicasts the data of the categories to be shared to all consumer edge servers of the collaboration channel and a record which comprises an identifier of a corresponding producer computing system and a digital certificate such that the data of the categories are shared among the consumer edge servers in a peer-to-peer (P2P) manner, each of the consumer edge servers verifies that the record has been provided by the corresponding producer computing system according to the digital certificate, and upon verification, decrypts the data of the categories, the set of central computing systems comprise virtual machines implemented in central data centers, the corresponding service provider collects digital images and environmental measurements which are uploaded to a corresponding edge server, and the corresponding edge server extracts biometrical parameters from the digital images and the environmental measurements.

19. The computer system of claim 18, wherein:

the corresponding service provider has: (i) a plurality of collection devices for collecting data of a set of data categories; (ii) one or more edge computing systems for pre-processing data including the data being collected by a corresponding group of the collection devices; and (iii) a central computing system for processing the data being provided by the edge computing systems; and the edge computing systems are physically closer to the corresponding group of the collection devices than the central computing system.

20. The computer system of claim 18, wherein the method further comprises:

receiving the authorization notifications is performed responsive to an agreement between a central computing system of a corresponding producer computing system and a central computing system of a corresponding consumer computing system to share the data of the shared category, and the agreement requires a manual confirmation according to a predetermined type of requirements.

* * * * *